United States Patent [19]

Michael et al.

[11] 4,240,101

[45] Dec. 16, 1980

[54] TELEVISION STANDARDS CONVERSION

[75] Inventors: Peter C. Michael, Newbury; Richard J. Taylor, London; Martin R. Trump, Newbury, all of England

[73] Assignee: Micro Consultants, Limited, Berkshire, England

[21] Appl. No.: 15,699

[22] Filed: Feb. 27, 1979

Related U.S. Application Data

[63] Continuation-in-part of Ser. No. 841,519, Oct. 12, 1977, Pat. No. 4,163,249.

[30] Foreign Application Priority Data

| Oct. 14, 1976 | [GB] | United Kingdom | 42751/76 |
| Jul. 26, 1977 | [GB] | United Kingdom | 31355/77 |
| Jul. 26, 1977 | [GB] | United Kingdom | 31356/77 |
| Jul. 26, 1977 | [GB] | United Kingdom | 31357/77 |
| Jul. 26, 1977 | [GB] | United Kingdom | 31358/77 |
| Jul. 29, 1977 | [GB] | United Kingdom | 31996/77 |
| Sep. 14, 1978 | [GB] | United Kingdom | 36837/78 |
| Sep. 14, 1978 | [GB] | United Kingdom | 36838/78 |

[51] Int. Cl.³ .................................. H04N 9/42
[52] U.S. Cl. ........................... 358/11; 358/140
[58] Field of Search .......................... 358/140, 11

[56] References Cited

U.S. PATENT DOCUMENTS

| 3,676,585 | 7/1972 | Kaneko et al. | 358/140 |
| 4,057,835 | 11/1977 | Kinuhata et al. | 358/140 |
| 4,068,266 | 1/1978 | Liao | 358/140 |

Primary Examiner—Richard Murray
Attorney, Agent, or Firm—Dowell & Dowell

[57] ABSTRACT

Digital standards conversion from one T.V. line standard to another including a processor for synthesizing picture points from adjacent picture point information derived from video signals from at least one field and a digital persistence arrangement for effecting movement interpolation between incoming and stored information. The digital persistence may be cylically varied field by field as well as being variable in dependence on any picture movement detected.

31 Claims, 30 Drawing Figures

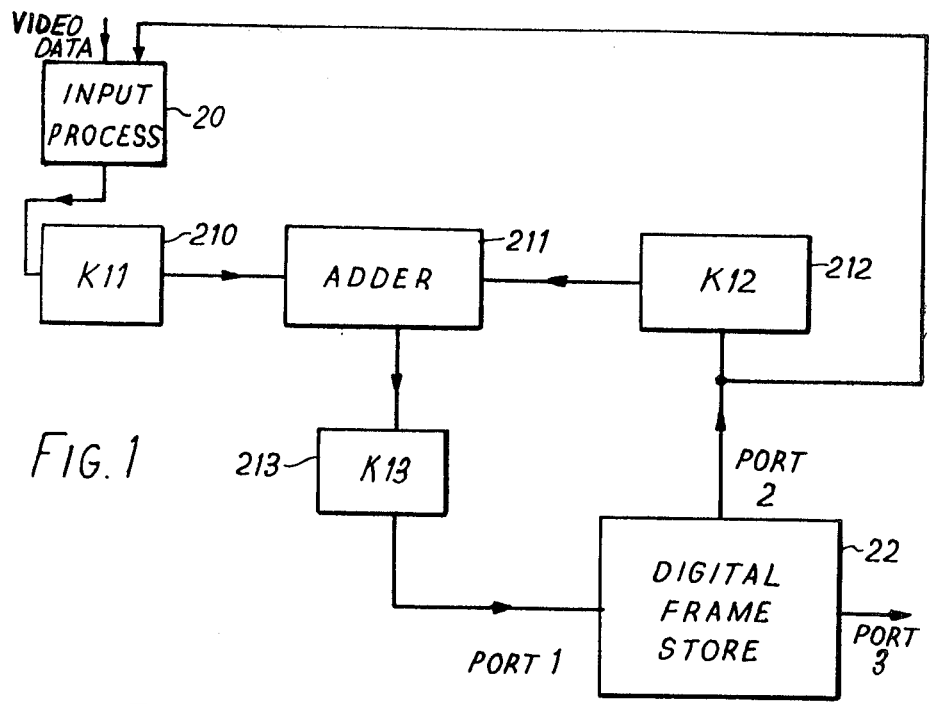
FIG. 1
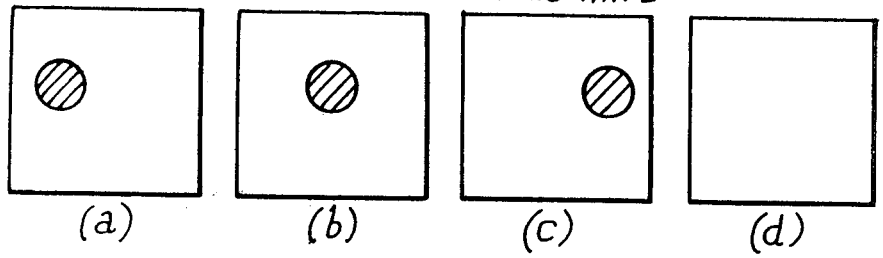
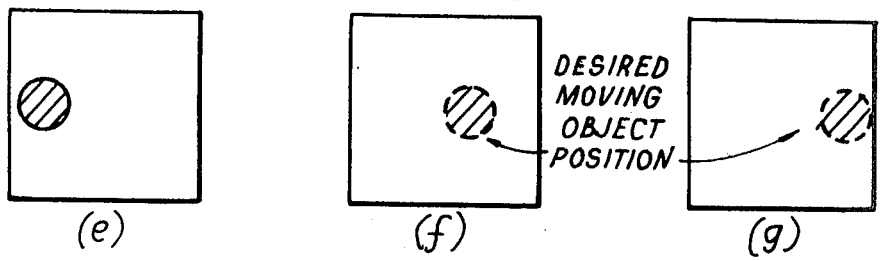
FIG. 2

TELEVISION STANDARDS CONVERSION

This is a contuation-in-part application to Ser. No. 841,519 filed Oct. 12, 1977, now U.S. Pat. No. 4,163,249.

BACKGROUND TO THE INVENTION

The invention relates to television standards conversion.

Standards conversion generally involves rearrangement of the television picture so that the incoming television standard has a different field and line frequency to the outgoing television standard. For example, a PAL to NTSC standards converter has an incoming line standard of 625 lines per frame whereas the outgoing standard has 525 lines per frame. One requirement is that the picture information contained in each frame is processed to give the correct number of lines for the outgoing frame.

A second requirement for a standards converter concerns the difference between the incoming and outgoing frame or field rates. A European PAL standard uses 50 fields per second whereas an NTSC standard used in the USA has 60 fields per second. Both standards of field rate are sufficiently fast to prevent flicker between successive fields being detected by the viewer. However, each field may be considered as a completely new picture which steadily builds up the movement which may be contained in the scene.

When undertaking standards conversion from one field rate to another field rate difficulties may be encountered due to distortion of movement information unless steps are taken to minimize the problem.

SUMMARY OF THE INVENTION

According to the invention there is provided a digital standards converter for video signals comprising processor means for synthesising picture points from adjacent picture point information derived from the video signals from at least one field, storage means for storing the information from at least one field, and digital persistence means for effecting movement interpolation between incoming and stored information.

Further according to the invention there is provided a method of effecting standards conversion on video signals comprising synthesising a number of picture points from adjacent picture point information derived from the video signals from at least one field, storing the information from at least one field and adding a portion of the stored information to the incoming information to effect movement interpolation therebetween.

BRIEF DESCRIPTION OF DRAWINGS

The invention will now be described by way of example with reference to the accompanying drawings in which:

FIG. 1 shows the basic standards converter,

FIG. 2 shows the requirement of a 60 to 50 field rate movement interpolator,

DESCRIPTION OF THE PREFERRED EMBODIMENTS

Figure 3:
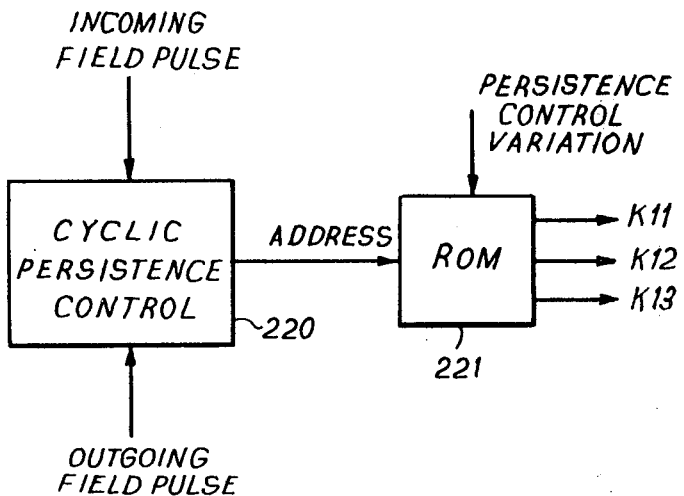
FIG. 3 shows an arrangement for effecting cyclic persistence in the standards converter of FIG. 1.

An arrangement for the standards converter is shown in FIG. 1.

Incoming video data is applied to an input processor 20. The incoming video will be in digital form, first having been converted from analogue form as necessary. The input processor 20 effects the synthesis of picture points from adjacent picture point information from at least one field. The number of picture points synthesised can be controlled to be greater or smaller than the original number of picture points for a particular field or frame thus effecting expansion or compression. For example, PAL to NTSC standards conversion will require taking an incoming line standard of 625 lines per frame and converting this to an outgoing standard of 525 lines per frame. Thus the number of lines is reduced and is comparable with a fixed amount of compression. The way in which the picture points are synethesised within processor 20 will be described in more detail later.

The data from processor 20 is received by modifier 210 where the data is modified by a coefficient K11 before receipt by adder 211. This data is added to previously stored data which has first been modified by coefficient K12 in modifier 212. The output of adder 211 passes via modifier 213 which modifies the data by coefficient K13 before storage in the store 22.

The reasons for this modification will now be explained.

In addition to the change in the number of lines for a frame the number of fields per second will change. For European PAL the field rate is 50 fields/sec and NTSC used in U.S.A. is 60 fields/sec. The reduction in the number of lines is effected by the input processor as already mentioned and the increase in field rate can be accommodated due to the asynchronous nature of the frame store which allows different write in and read out rates. A proportion of the data from the old frame is combined with a proportion of the new frame using the 'leaking' integrator system i.e. coefficients K11, 12, 13 to produce smooth movement (movement interpolation) at different frame rates.

In the digital standards converter it is required to modify the coefficients k11, k12 and k13 on a cyclic basis. The effect of using a cyclic variation may be utilised to provide 'movement interpolation'. The digital standards converter requirement alters depending upon the type of scene under examination. Movement interpolation minimises distortion due to movement since standards conversion necessitates conversion from say 525 lines—60 fields per second (NTSC) to 625 lines—50 fields per second (PAL).

If an incoming picture having an incoming field rate of 60 fields per second carries a moving image, then successive pictures provide a general increment of the image moving from left to right on the screen. The outgoing pictures concerned with the outgoing fields are at 50 per second. In an ideal movement interpolar an image of the moving object provided on the outgoing picture would need to be provided in a position which is not depicted on the incoming fields.

Figure 23:
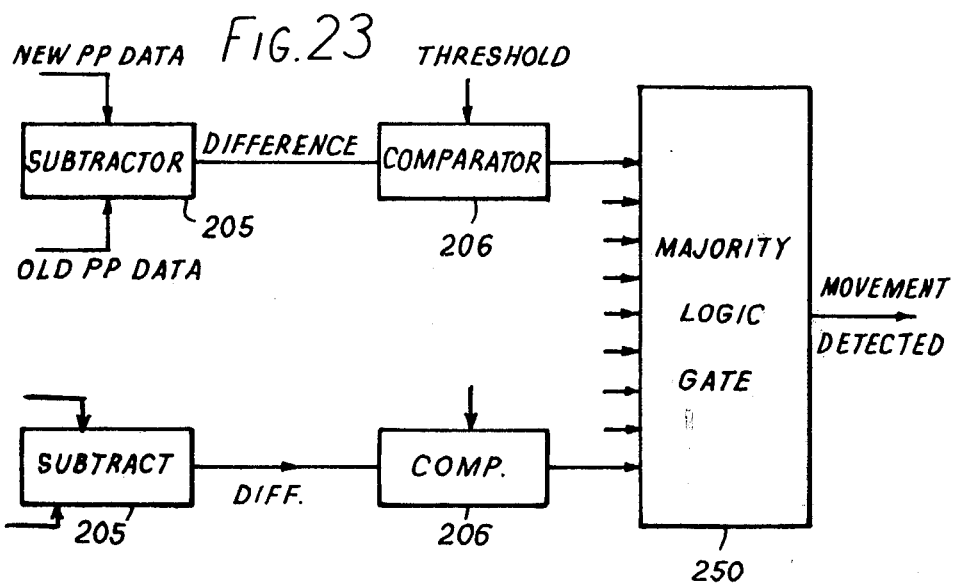
FIG. 23 shows an arrangement for effecting the area voting detection.
Figure 24:
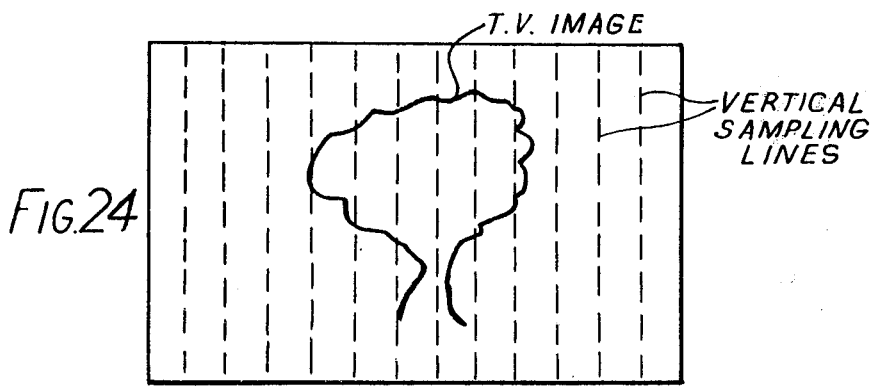
FIG. 24 shows movement detection using vertical sampling to detect camera panning.

Such a moving object is shown in FIG. 24. Successive pictures at 60 Hz field rate are shown at FIG. 23 (a), (b), (c) and (d) and successive pictures at 50 Hz field rate are shown at (e), (f) and (g).

To implement a movement interpolator capable of reproducing the function described in the paragraph above requires that the system is sufficiently intelligent to recognise the outline in one field and measure the movement which has taken place in another field. Information could then be extracted which would enable an artifical image to be drawn in the correct position on an outgoing field. Such a process would be a true movement interpolar. However, current technology is not sufficiently advanced to enable engineers to implement such a design using any known technique.

However, a reasonable simulation of movement interpolation may be implemented by utilising components from several fields in various proportions to artifically delude the viewer into believing he is seeing true movement interpolation.

The system of movement interpolation now described makes use of three different techniques to portray movement in the most acceptable subjective manner. The system is variable and adaptive. Techniques have been developed which enable the adaption system to be semi-automatic.

The three techniques utilised are categorised below:

(a) Field sequence interchange
(b) Digital persistence
(c) Digital cyclic persistence variation The three techniques are now described.

The incoming picture field sequence may be considered to start at a known position in time with respect to the outgoing picture field sequence. As the picture arrive sequentially the error which occurs in the outgoing picture field sequence increases over a period of twelve incoming fields and ten outgoing fields in a 60 field to 50 field converter.

The assumption has been made in the above paragraph that the two different types of field (odd field and even field) cannot be interchanged in the sequence. The resultant discontinuous movement is clearly visible to the observer.

If the field sequence is changed so that an odd field is being displayed as an even field the amplitude of the discontinuity can be reduced by a factor of two.

The input processor (using adaptive volume manipulation described below) is capable of accurately changing an odd field to an even field or an even field to an odd field without introducing distortion of the fixed and moving image. In this standards converter use is made of the adaptive volume manipulation to undertake a field sequence variation thus reducing the amplitude of the visible movement discontinuities.

An improvement to the subjective effect of movement discontinuity is provided by using digital persistence. A normal television system has a small amount of residual memory due to the effect of phosphor decay. A controlled persistence is introduced in the standards converter by utilizing the frame store memory together with coefficients which control the persistence. Thus coefficients k11, k12 and k13 dictate what proportion of the previously stored picture is added to the new picture avialable from the incoming data stream before re-storing in the memory. It is possible to arrange the system with only two ports but more typically three will be utilised. Port 1 is an input port allowing data to be entered into the framestore. Port 2 is an output port which may be considered synchronous with port 1 allowing information to be extracted from the memory. Port 3 is an asynchronous output port which allows the input and output system to be run at different speeds.

In the basic digital persistence system coefficients k11, k12 and k13 are fixed. Typical values are shown below:

k11=0.625
k12=0.375
k13=1.0

The movement portrayal utilising digital persistence brings the subjective effect closer to the ideal. However, different viewers could choose different values for the coefficients which suits them best. Variation of k11, k12 and k13 by a control function which may be accessible to the viewer would provide a means of selecting such values.

The effect of movement in a standards converter gives rise to a cyclic discontinuity. Major improvments to the subjective effect may be provided if the digital persistence is varied in a similar cyclic pattern. A typical cycle for k11 is shown below:

| Field | k11 |
| --- | --- |
| 1 | 0.5 |
| 2 | 0.625 |

-continued

| Field | k11 |
|---|---|
| 3 | 0.75 |
| 4 | 0.875 |
| 5 | 1.0 |

The cycle repeats every 5 fields at the output. Once again subjective viewers may choose different values of k's to suit their own viewing requirements and provision is made to alter the value of k by a mechanism which may be available to the viewer.

The way in which the cycle can be effected is shown in FIG. 3. A cyclic persistence control 220 incorporating address counters receives incoming field pulses and outgoing field pulses and provides an address as a result of the comparison. The address provided is used to look up k11, k12 and k13 in a read only memory (ROM) 221. The ROM has a number of coefficient stored which may be accessed by the address. In addition the ROM has an input for varying the persistence control. The persistence control variation input selects a group of coefficients stored in the ROM. If a single ROM is not large enough to accommodate all the coefficient needed a number of ROM's may be simultaneously addressed and selected by the persistence control variation input. The operation and control of a ROM is well known for digital processing.

Figure 4:
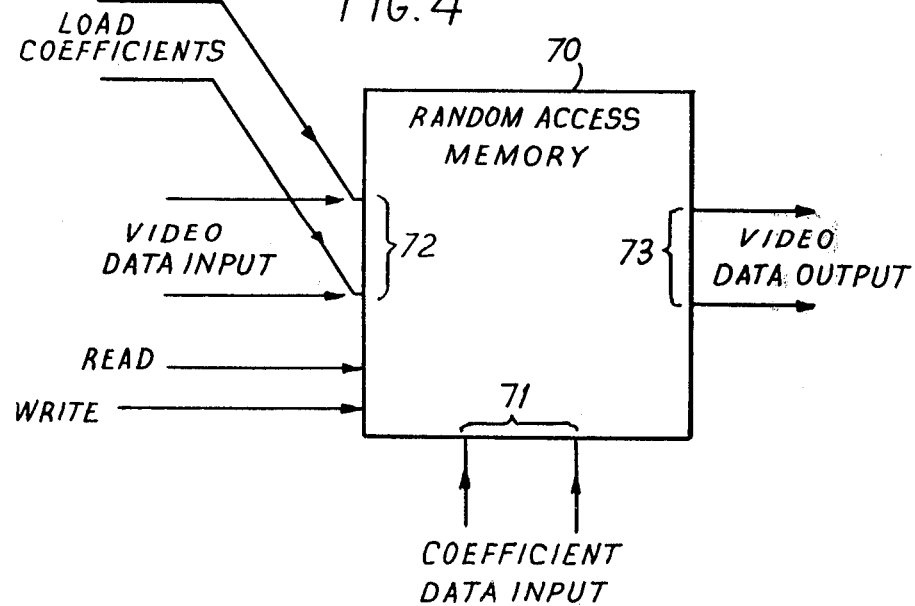
FIG. 4 shows a random access memory used as a multiplier

The selected coefficients at the ROM output for k11, k12 and k13 are received by modifies 210, 212 and 213. The multiplying function of the modifier may be provided by using a random access memory as shown in FIG. 4.

The RAM 70 shown is of 8×256 bit capacity and such memories and their mode of operation are well known in digital processing. The coefficients are loaded into the store locations within the RAM during a write cycle. The coefficient data from the ROM is applied to the RAM data input 71 shown in FIG. 4. The location to which data is written in is determined by store address data input 72. Address data is applied in the normal way to the address input 72 to input the coefficient data at input 71. The addressing data is shown as 'load coefficient'. During operation as a multiplier (ie. read cycle) the incoming video data is applied to the RAM 'address' terminals 72. The RAM has sufficient addresses so that each input number identifies one particular location within the store. Thus as each location has a preloaded coefficient stored therein when a particular location is accessed (i.e. in dependence on the incoming data which effectively defines the address), the data stored in a particular location is read out from the RAM at output 73. This data will either be an 0 or 1 depending on the predetermined coefficient. Thus the 8 bit input data for a particular picture point will effectively be multiplied by the selected coefficient.

The output from coefficient modifier 210 is applied to one side of M bit×Q bit wide adder 211. Standard arithemetic elements are used for the adder 211. Similar look up systems are provided for each coefficient k11, k12 and k13.

The adaptive volume processing function within processor 20 will now be described in more detail, dealing first with area processing to explain the basic operation.

Figure 5:
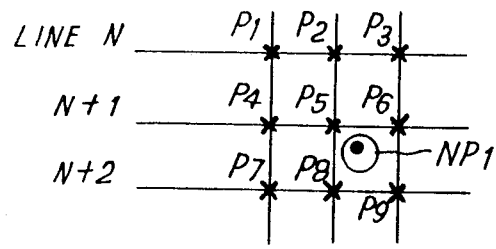
FIG. 5 shows the area processing function of the input processor.

In a system described in British patent application No. 42751/76, the generation of a new picture point is effected by taking into account information from the surrounding picture points (i.e. area manipulation), as shown in FIG. 5.

The basic requirement is the synthesis of a picture point which did not exist as a picture point on the incoming video data. The engineer aims at producing the best estimate of the likely value of a picture point by examining picture points around the synthesised picture point and either adding or substracting various proportions of them to produce the best result.

Successive picture points P1 to P9 on adjacent lines N, N+1 and N+2 are applied to the input processor. Each of the points P1 through P9 is modified by coefficient K1 through K9. The resultant sum is a new picture point designated NP1 where $$NP1 = K1P1 + K2P2 \approx K3P3 ... \text{etc through } K9P9.$$

If the input area processor function is operating to reduce the picture size for compressed pictures the output data may appear more slowly than the input data. Thus for compression, the number of new picture points produced will be less than the original number of picture points but each new picture point will be derived from data on the nearest 9 picture points. How the processor effects this frunction will now be described.

In order to reduce the size of a standard television picture, interpolation is needed across the picture area. In the systems described the total television picture is broken up into a number of picture points. The picture could typically be broken into 512 picture points per line for a 525 line picture. As already described with reference to FIG. 3, the area process function is effected for new picture point NP1 by the expression $$NP1 = K1\ P1 + K2\ P2 ... K9\ P9.$$

Figure 6:
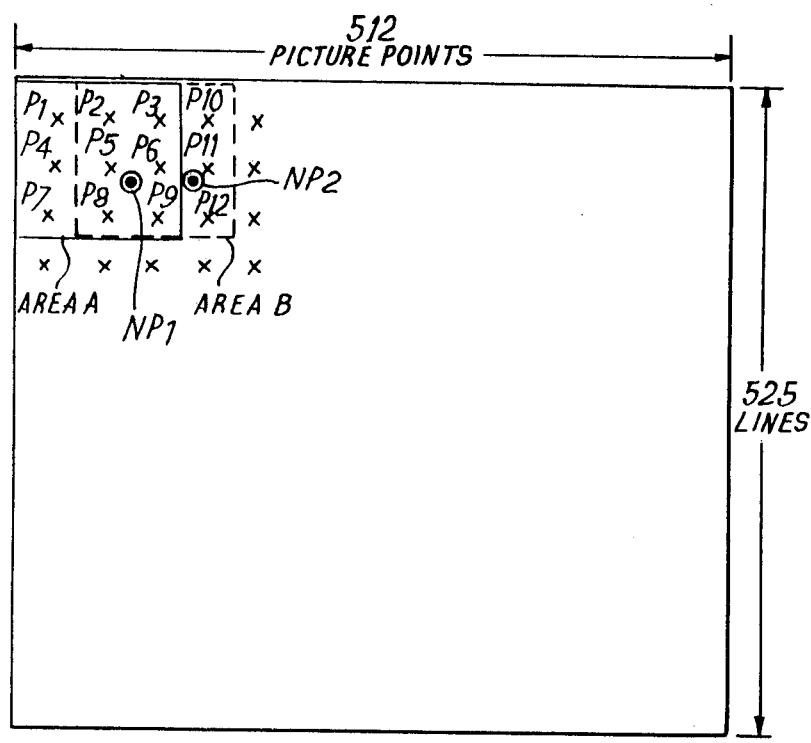
FIG. 6 shows the areas processed in relation to the normal T.V. picture.

This area is designated Area A in FIG. 6. When calculating the next picture point NP2 (say) the values of coefficients K1 to K9 for Area B will be different to those for Area A thus $$NP1 = K1A\ P1 + K2A\ P2 + K3A\ P2 + ... K9A\ P9 \text{ and}$$

$$NP2 = K1B\ P2 + K2B\ P3 + K3B\ P10 + ... K9B\ P12.$$

Thus the input area process remains the same but the coefficients K1 through K9 are variable.

The operation of area interpolation occurs in real time and as the data represents incoming information scanned horizontally the coefficients K1 through K9 have to change across the length of 1 television line. In the system described the switch occurs between picture points.

In the same way vertically the boundaries between the lines represent coefficient changes. Each new picture point is computed from information available from the nearest 9 picture points to that new picture point.

In order to switch coefficients between the picture point boundaries horizontally excess look-up tables are provided within the basic system. However as it is possible to re-load data into the look-up tables when they are not in use it is possible to implement the system utilising only one complete set of excess look-up tables. (Look-up tables have already been described with regard to coefficients K11–K13.)

Figure 7:
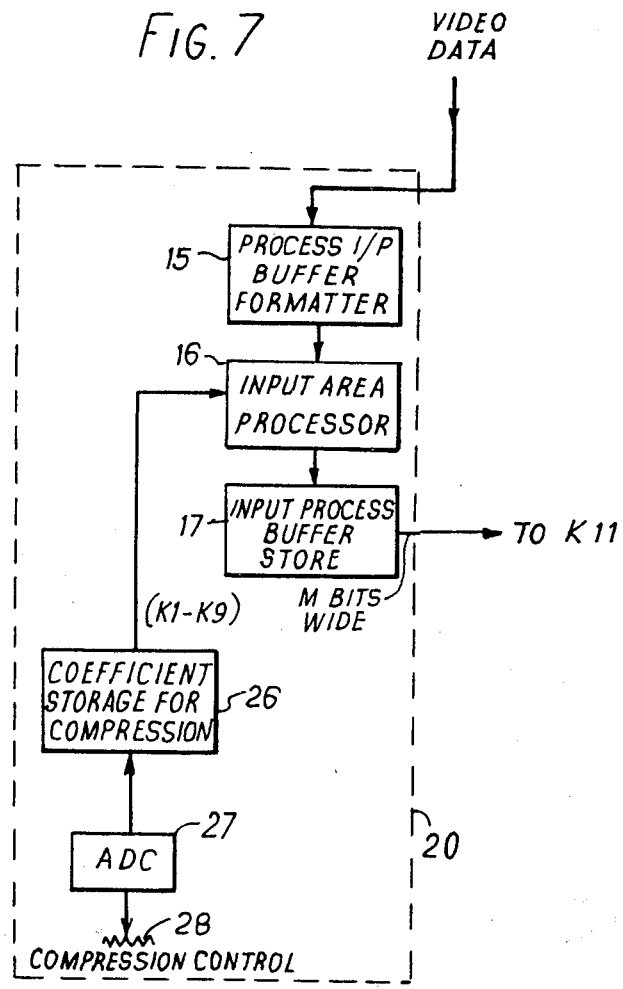
FIG. 7 shows the area processor in more detail.

FIG. 7 shows the area processing function of processor 20.

The digital video data (e.g. 8 bit wide) is applied to a process input formatter 15 which formatter accepts the digital data stream in the order presented, stores it and represents it so that the input area processor 16 may operate on the signal.

The input area processor 16 is an area processing operation which accepts a number of picture points from adjacent lines horizontally and adjacent points vertically. As just described a coefficient is applied to each of the input points and the resultant output is a single data word for ea h new picture point which is the sum of various proportions of the input data points over the area being processed. The required compression coefficients are stored in a coefficient store 26 and the degree of compression can be controlled by compression control 28 via ADC 27. For standards conversion the degree of compression (or expansion) will be fixed.

The input processor buffer store 17 accepts data from the area processor 16 at the rate presented and re-formats it for handling by the other elements in the system.

Figure 8:
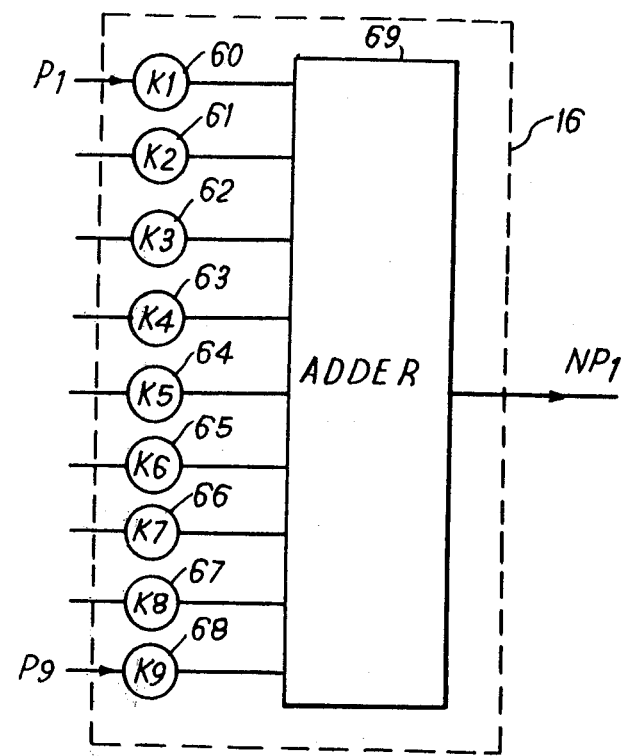
FIG. 8 shows multipliers and adder used for the area process.

The area processor 16 is shown in detail in FIG. 8. Mulipliers 60–68 each receive data on one picture point (P1–P9) and multiply the data by coefficients K1 to K9 respectively, which coefficient will each be variable but preset. The modified data is added in adder 69 which comprises a 9 input×8 bit digital adder. The output from adder 69 will be the new picture point NP1.

The coefficient multiplier function of area processor 16 (i.e. multipliers 60–68) can be effected by using random access memories (RAM), and such multipliers have already been described with reference to the RAM of FIG. 4. Nine such multipliers would be provided.

An improvement in the basic system of FIG. 7 has been achieved by using volume manipulation. Volume manipulation has been found to produce a better subjective result than area manipulation by itself. Volume manipulation adds another dimension to the matrix of picture points which may be used. Area manipulation used only horizontal and vertical dimensions. Volume manipulation uses horizontal, vertical and time dimensions. The synthesis of a new picture point using volume manipulation makes use not only of the adjacent picture points in the horizontal and vertical dimension of one picture but also of information coming from the next picture or series of pictures. Volume manipulation is the subject of British patent application No. 31355/77.

Figure 9:
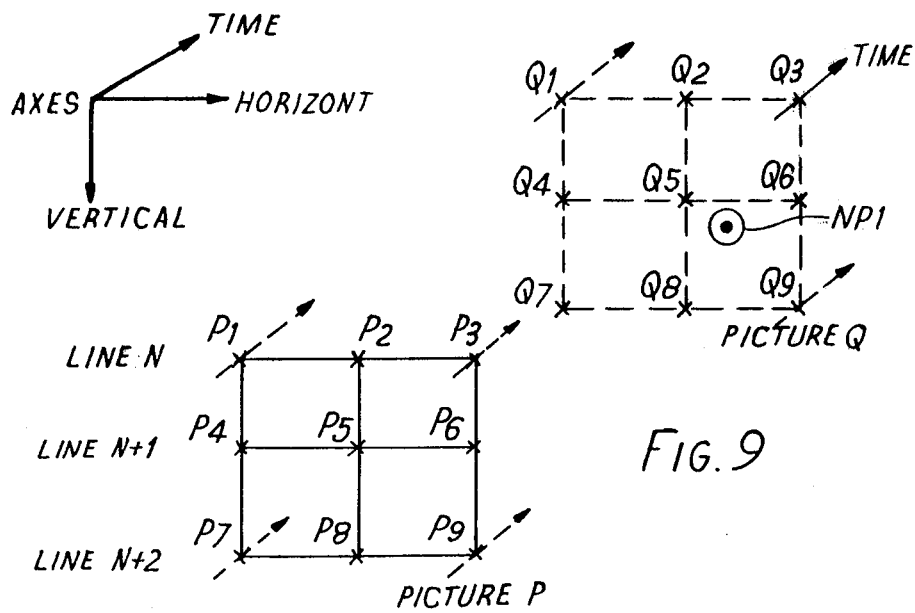
FIG. 9 shows the volume processing function for the input processor.

FIG. 9 shows a 3×3×2 volume manipulation matrix. In each of two successive fields (successive pictures P and Q) 9 pictures points P1 to P9 and Q1 to Q9 are defined. These 18 points are those closest to the new picture point NP1 to be synthesised together with picture points some little distance away. Thus P1 to P9 are the original picture points on picture P and Q to Q9 are the picture points on picture Q.

The new picture point is calculated from the expression below $NP1 = K1P1 + K2P2 + K3P3 + K4P4 + K5P5 + K6P6 + K7P7 + K8P8 + K9P9 + k1Q1 + k2Q2 + k3Q3 + k4Q4 + k5Q5 + k6Q6 + k7Q7 + k8Q8 + k9Q9$ The way in which the addition and multiplication is effected has already been described. The system is expanded however to handle the additional coefficients and picture points.

Figure 10:
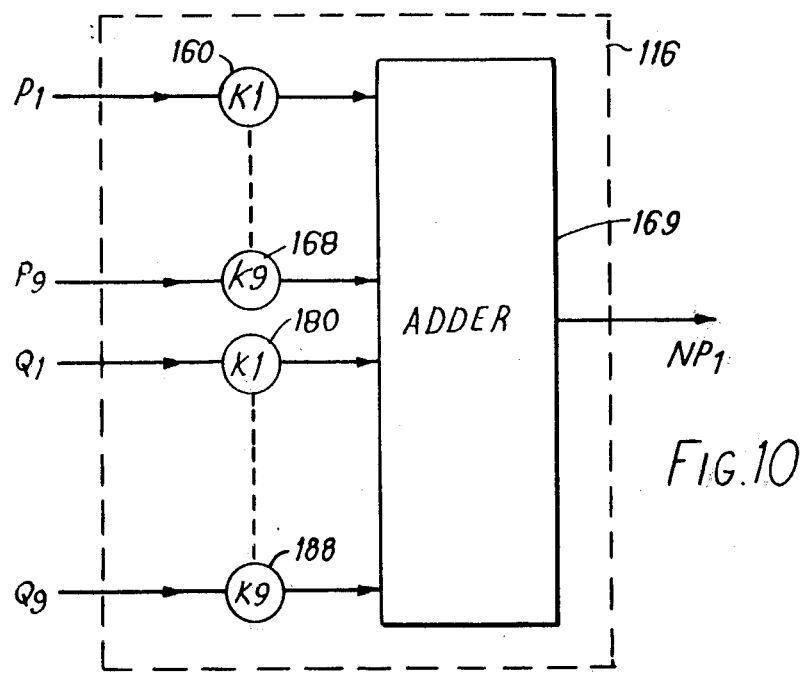
FIG. 10 shows the construction of a suitable volume processor.

A circuit which could be used to implement the solution for NP1 is 18 separate real time multipliers feeding into an 18 input adder. Such as arrangement is shown in FIG. 10. Volume processor 116 comprises multipliers 160 to 168 for the picture points P1 to P9 and multipliers 180 to 188 for picture points Q1 to Q9. The multiplier outputs are connected to adder 169. Serial operation of some multipliers and adders may be utilised or a combination of serial-parallel adding and multiplication may be used. As already described the volume manipulation is used for picture point synthesis to enlarge or reduce the size of the television picture. Utilisation of this principle produces imperceptible picture degradation over a very large picture size change, and this principle is used to produce a digital standards converter capable of changing the picture size from 525 to 625 line standards or 625 to 525 line standards.

The volume manipulation principle described above produces imperceptible degradation if the scene being viewed remains stationary or near so. Moving scenes can cause errors in the solution to the synthesised picture point. A technique for preventing degradation is to utilize 'adaptive' volume manipulation.

Simple volume manipulation utilises approximately the same amount of information from both picture P and picture Q. The percentage utilised from each picture varies over the screen and depends upon the magnification or size reduction operating at any time. K1 to K9 and K1 to K9 are caused to vary depending upon the magnification or size reduction demanded. This mode of operation is generally similar to the area manipulation except that the picture points from picture Q are included.

Adaptive' volume manipulation reduces the proportion of picture P utilised to generate the synthesised picture point in P1. K1 to K9 are reduced to a low value and k1 to k9 are increased in value under conditions when picture degradation would be caused (i.e. a greater proportion of picture Q is used).

Volume manipulation minimises the picture degradation by giving the processor access to incoming picture points which are as close as possible to the synthesised picture point being generated. The principle potential for degradation occurs when a scene changes between picture P and picture Q. Such a change may be caused by movement and generally all changes are ascribed to this cause whatever their actual source—for example noise on the signal will give a signal change which can be mistaken for picture movement.

In the system now described movement detection is determined by measuring the change which has occurred between one successive picture point and the next. A threshold level is ascribed to the different between the two levels and movement is determined to have taken place when the threshold is exceeded in either direction. Use of a movement detector makes the volume processor 'adaptive'.

Figure 11:
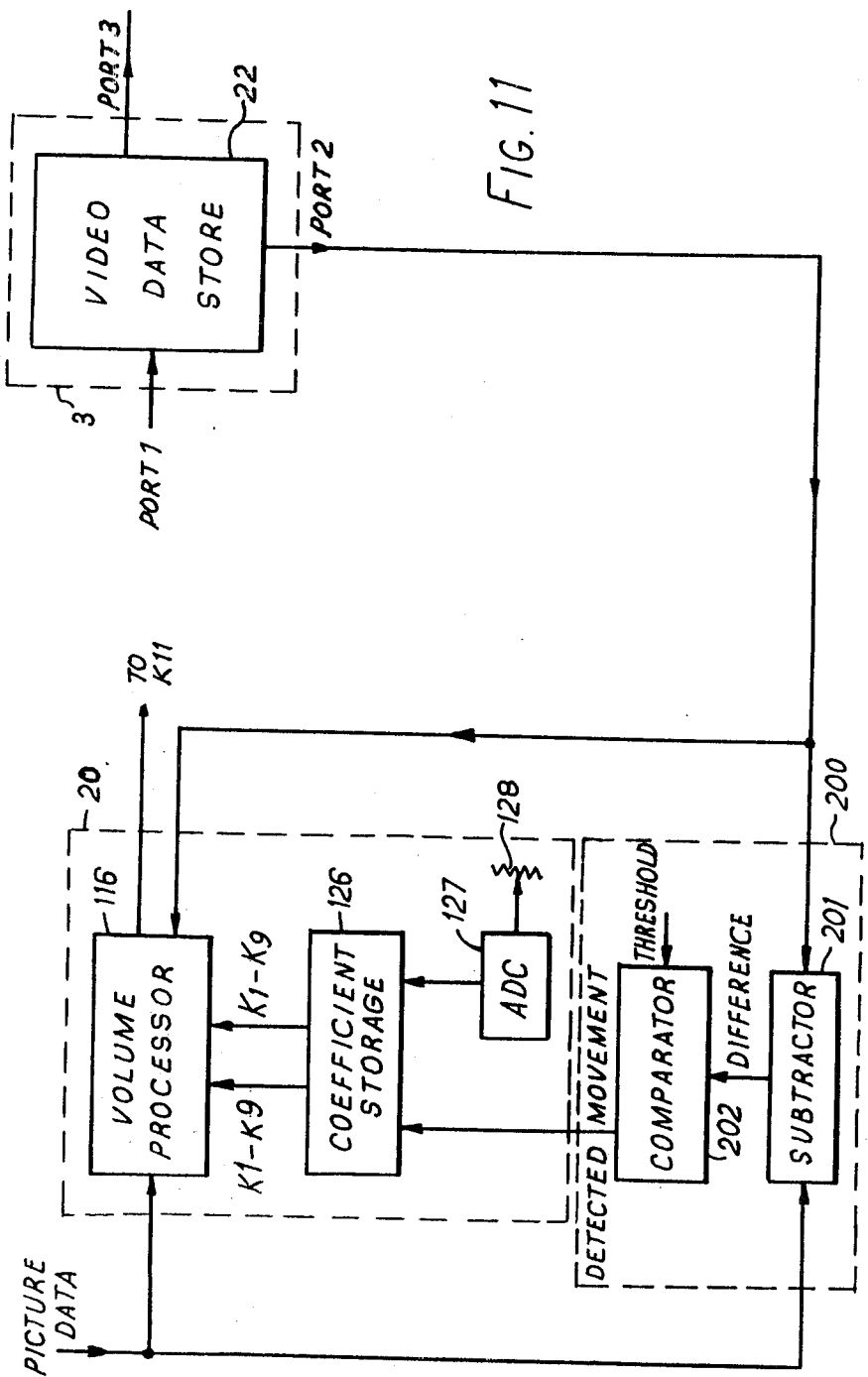
FIG. 11 shows the volume processor under the control of a movement detector.

The adaptive volume processor system is given access to the movement detector and utilises the information to change the coefficients of K1 to K9 and k1 to k9. FIG. 11 shows this arrangement. New data is input to one input of the subtractor 201 of movement detector 200 and data from store 22 applied to the other input of subtractor 201. The difference signal is input to comparator 202 where it is compared with the threshold and when movement is detected the signal passes to coefficient store 126 so that different values for the coefficients are selected. The picture compression for volume processor 116 is effected by control 128 via ADC 127 as before. The processor output passes to the store as before via the coefficient modifier system. (Input and output buffering have been omitted for the sake of clarity.) Alternatively the volume manipulation processor could be located at the system output after the store.

The description above of adaptive volume manipulation has used 9 picture points in two successive pictures to provide a synthesis of the new picture point. Experiments have been made with various values for the number of picture points to be used and their allocation. A particular case exists when only a single line of information is used in picture P and two lines of information are used in picture Q. Such a special case of volume manipulation has been used for specific applications with a consequent reduction of the circuitry needed for implementation. In this case the vertical component of NP1 is given by the equation:

(Vert) NP1=K1Q1+k4Q4+K1P1

Figure 12:
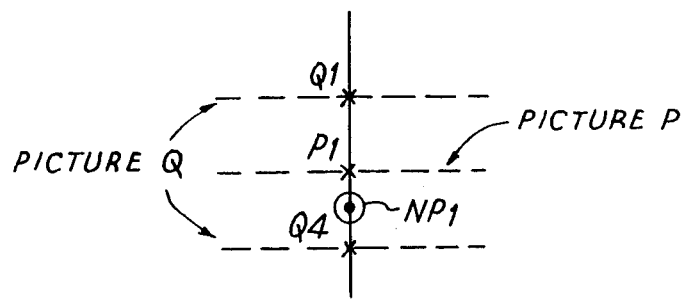
FIG. 12 shows an alternative area processing function.

Values of k1, k4 and K1 are varied according to the picture size required and under the control of the movement detector. FIG. 12 shows only the computation of the vertical component of NP1.

Horizontal interpolation may be undertaken using real time multipliers. Another method of undertaking horizontal interpolation is to vary the clock frequency of the input and output to a store. In a simple example a line may be clocked into a line store at one speed and clocked out of the same store at a different speed. The effect is a horizontal expansion or contraction depending upon the relative speeds of the input and output clocks.

Figure 13:
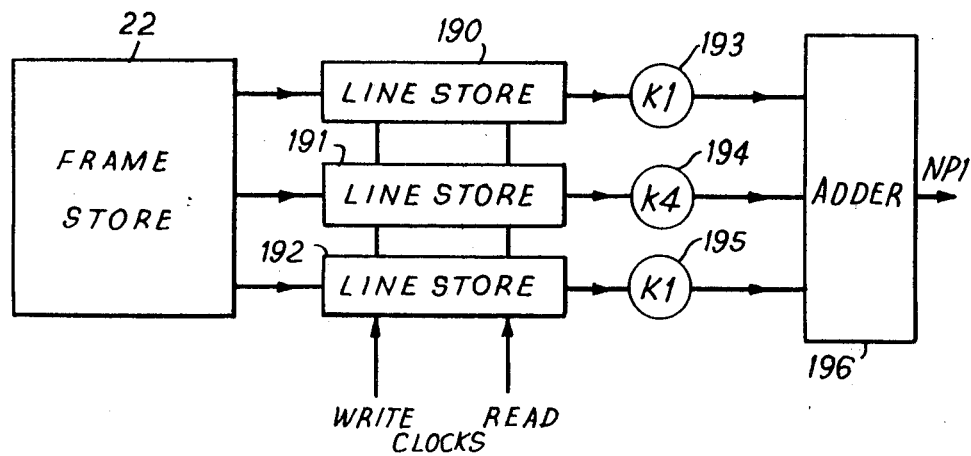
FIG. 13 shows an arrangement for horizontal expansion or contraction using variable write-read clock pulse frequencies.

The principle has been utilised in conjunction with the special case of volume manipulation described above to provide a specific range of expansion and contraction. FIG. 13 shows an arrangement of horizontal expansion or contraction using variable write/read clock frequencies. Picture data from frame store 22 is input to line stores 190, 191 and 192 at one input clock rate and read out at a different speed to multipliers 193, 194, 195 for coefficients k1, k4 and k1 respectively. The multiplier outputs are connected to adder 196 to produce NP1.

The combination of these two special cases shown in FIG. 12 and FIG. 13 reduce the requirements for circuit complexity considerably.

The data store 22 has three data ports 1, 2 and 3. Port 1 allows data to be written into the store, port 2 allows data to be read from the store at a location corresponding to port 1 and port 3 allows data to be read from the store at another location. In principle the three ports run asynchronously. The data store may take the form of a system described in British patent application No. 6585/76 (U.S. patent application No. 764,148). The store is large enough to store at least one complete television frame of Y, I and Q information at full bandwidth (5-6 M bits).

The store will have an associated store control which includes address counters for addressing the various memory addresses within the frame store for a read or write cycle and timing control for producing timing signals for addressing the memory elements at the correct point in time, in known manner and as explained in detail in the above referenced patent application. The store itself may be constructed from known 64×64 bit memory chips (i.e. 4096 by 1 bit RAM) which bit locations are accessed by entering row and column address information from the store control as an 18 bit address derived from picture point counters. As the 4096 random access memory chip is dynamic, a refresh cycle must also be effected to retain the stored data. Refresh address counters are therefore included. For example, a store using 16 cards each containing 32 RAM chips would provide a framestone of 256×512 words 8 bits wide to allow 512 video lines each of 512 picture points to be stored.

The storage capacity could be expanded as required. The asynchronous nature of the store allows the difference in frame rates to be accomodated together with the compression and field sequence variation to effect line standards conversion.

Figure 14:
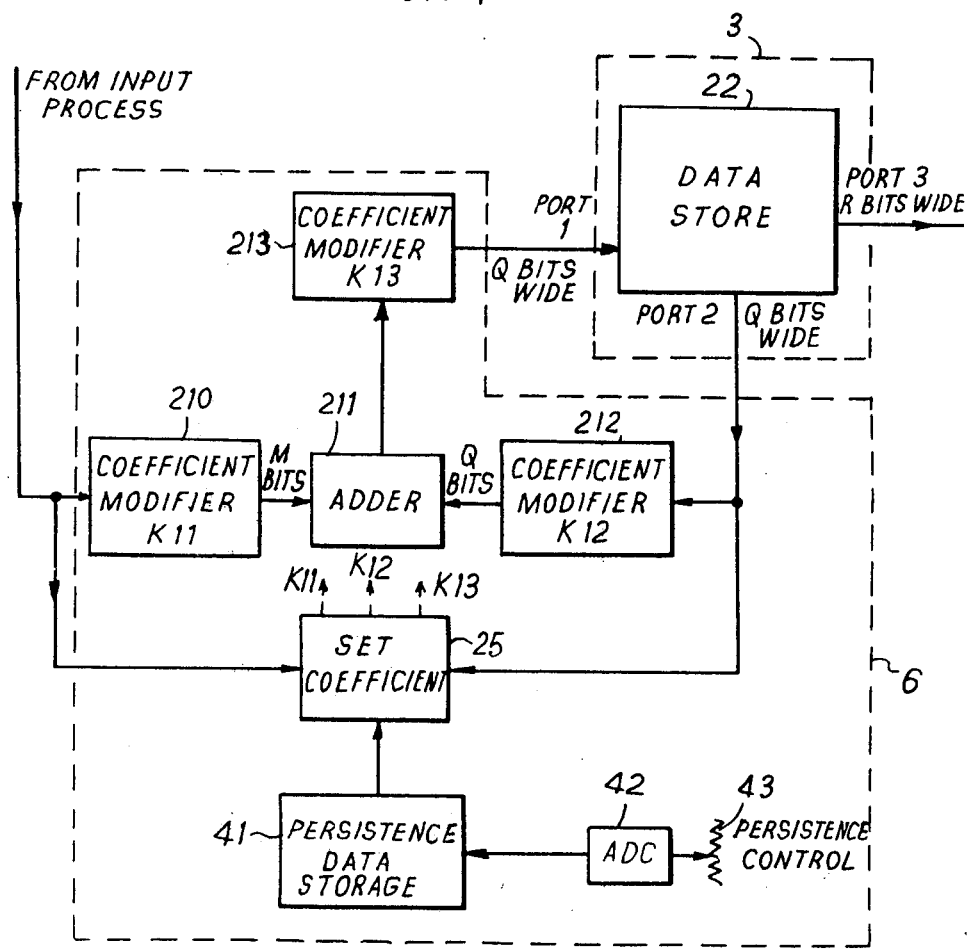
FIG. 14 shows a more comprehensive digital persistence arrangement.

In the standards converter, the digital persistence as set by K11, K12 and K13 has been described as fixed for a given field, and the selected value changing field by field over 5 fields for example. With pictures having a content which is moving it is desirable to vary the amount of digital persistence on a picture point by picture point basis to avoid distortion. FIG. 14 shows a more comprehensive arrangement for controlling the digital persistence. The ROM of FIG. 3 could be provided with coefficient unit 25. The preset control of the persistence is effected by control 43 which has its output connected to analogue to digital converter 42 which produce a digital number for persistence data store 41 which provides the data for controlling the coefficients generated by ROM 221 of FIG. 3. The cyclic change in persistence can be provided as before by cyclic control 220 which address the ROM (see FIG. 3). In addition the coefficient unit 25 is shown as receiving incoming and stored data to detect when picture movement is occurring. The movement detector is conveniently included in unit 25. A movement detector has already been described in FIG. 11 which examines the video data on an individual picture point by picture point basis to operate a comparator. In the arrangement now shown in FIG. 15 the movement detector comprises a subtractor 205 controlling a ROM 206. The difference signal is now used to address read only memory which contains various coefficients of k11, k12 and k13 in fixed storage locations. Large movements are differentiated from small movements and a sliding scale of coefficients k11, k12 and k13 is provided on a real time basis. A movement code is available to be used by the volume processor as described above making the requirement of a separate movement detector for the volume processor unnecessary. The way in which this movement code is generated will be described below.

Figure 16:
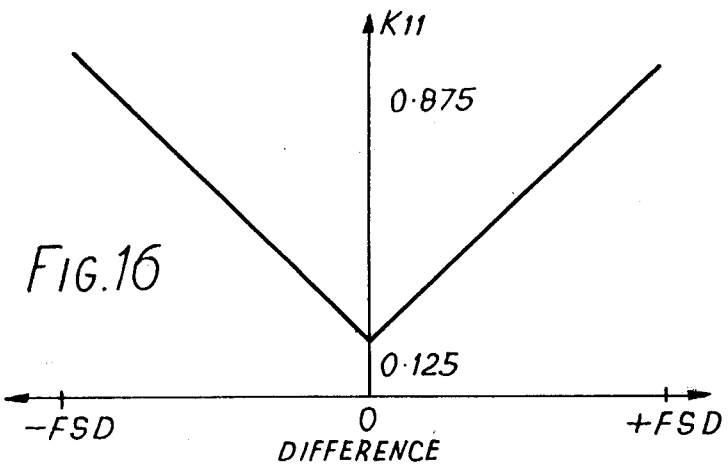
FIG. 16 shows variation of coefficient K11 in dependence on detected difference.

FIG. 16 shows a typical example of the coefficient k11 as stored in ROM. The graph is shown against two axis. The difference signal is the horizontal axis whilst k11 is the vertical axis. If there is zero difference between old data and new data k11 is set to the lower limit. If there is a full scale difference of either polarity between old data and new data k11 is set to the upper limit.

Any value of the difference measured lying between zero and full scale will give a corresponding value of k11 from the graph.

Figure 17:
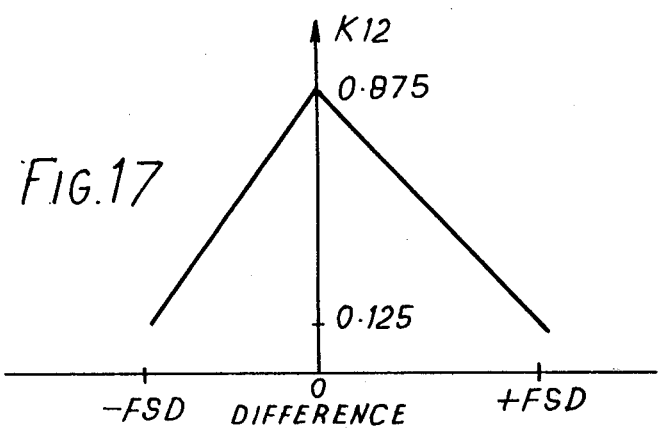
FIG. 17 shows the variation for K12.

The same difference signal produced by subtractor 205 is used within the ROM to calculate the value of K12 as shown in FIG. 17. If there is zero difference between old data and new data k12 is set to the upper limit. If there is a difference signal between old data and new data approaching full scale k12 is set to the lower limit. Between the two extremes a sliding scale for values of k11 and k11 is chosen. The settings for k13 could be similarly effected.

The operations of ROM 221 (of FIG. 3) and ROM 206 (of FIG. 15) could conveniently be combined.

Figure 15:
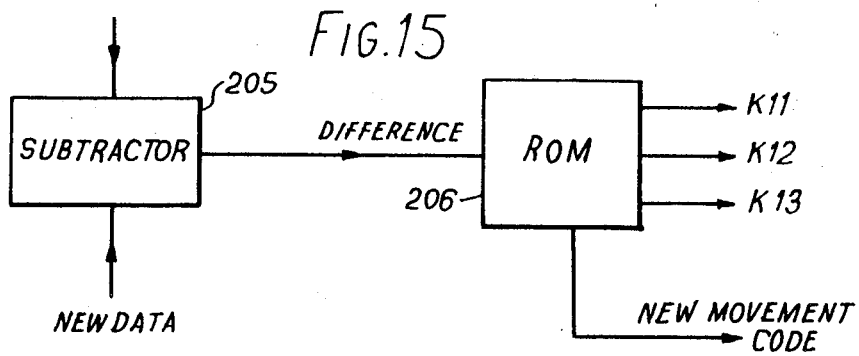
FIG. 15 shows a movement detector arrangement using a ROM for multilevel coefficient setting.
Figure 18:
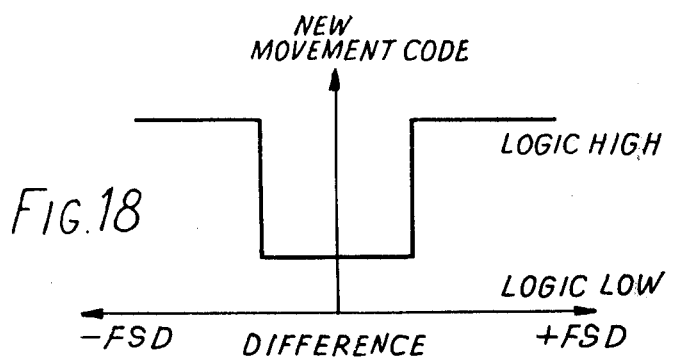
FIG. 18 shows an example of a suitable movement code generated in the FIG. 15 arrangement.

As mentioned concerning the ROM 206 of FIG. 15 the system provides movement information to the adaptive volume processor. This is provided by a single data bit available as a function of the difference signal and stored in the read only memory. FIG. 18 shows the movement code to be applied to the volume processor. The transfer function is similar to the simple comparator and threshold mechanism. Provided that the difference does not exceed a given threshold value the movement code remains at a logical low. If the difference signal exceeds the threshold value the movement code becomes logical high. No intermediate values are permitted between logical low and logical high. In practice it has been found that the threshold for movement coding may be set to a fixed level to cover all input signal variations.

The movement code bit derived from the mechanism just described is stored together with the video data in the store 22 as before. One of the bits in each location is allocated to storing the movement code to be later used by the adaptive volume processor.

Figure 19:
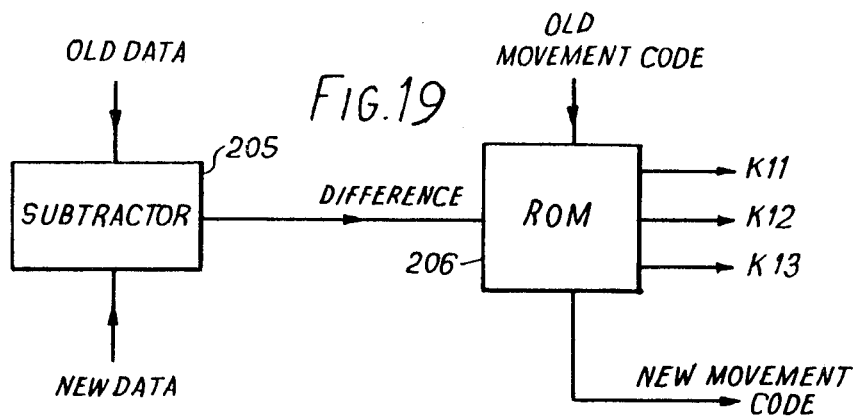
FIG. 19 shows an alternative movement code setting system using the movement code from previous data.

In addition to the use of the movement code in the volume processor the stored movement code may be utilised to provide more intelligent adaptive control of the persistence system. At the same time that the video data is retrieved from port 2 the old movement code is extracted and applied to the ROM. Two different coefficient curves for k11 are stored in the ROM and are accessed in dependence upon the value of the old movement code. This ensures that the scene has been stationary for two frame periods before applying the heavier persistence coefficients. Such an arrangement is shown in FIG. 19. ROM 206 receives the difference signal and the old movement code and produces the settings for k11, k12 and k13 together with the new movement code.

Figure 20:
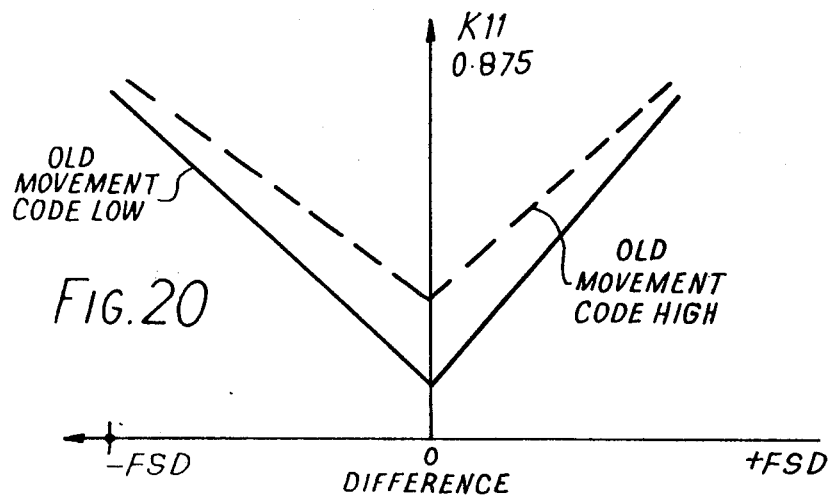
FIG. 20 shows coefficient K11 modified in dependence on the previously stored code.

FIG. 20 shows the two different curves for k11. The upper curve shows when old movement curve is high and the lower curve when the old movement curve is low. In a similar way curves are stored for two different coefficients of k12 and k13.

The description so far is for an adaptive system which can change on a point to point basis and is generally controlled by a point to point comparison. As discussed earlier, a number of effects may give rise to a change in coefficient and not all the effects are due to movement. For example, impulsive noise or tape recorder noise may also give rise to a different signal which is interpreted as movement. The descriptions which follow offer several mechanisms which distinguish between true movement and noise.

Figure 21:
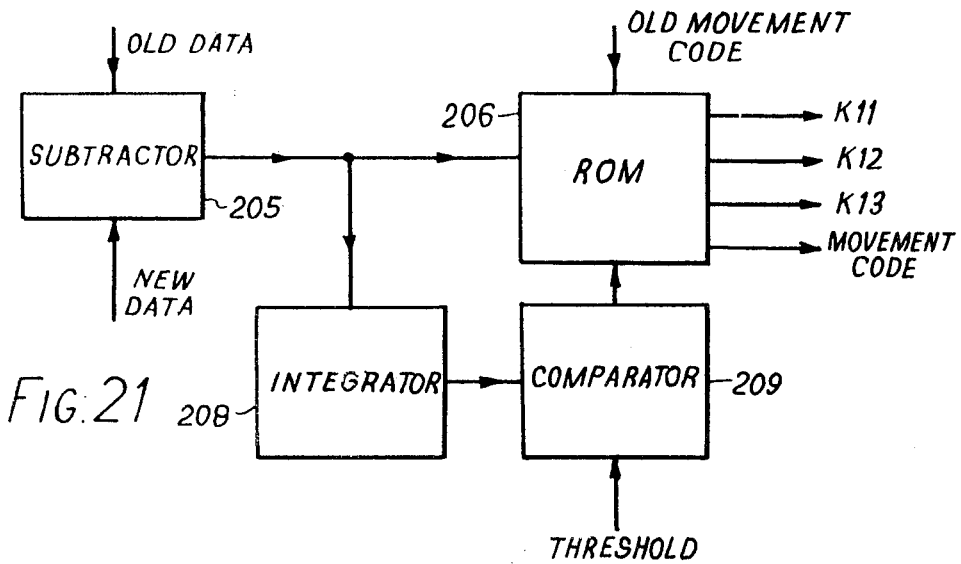
FIG. 21 shows an arrangement using overall difference integration for movement detection.
Figure 22:
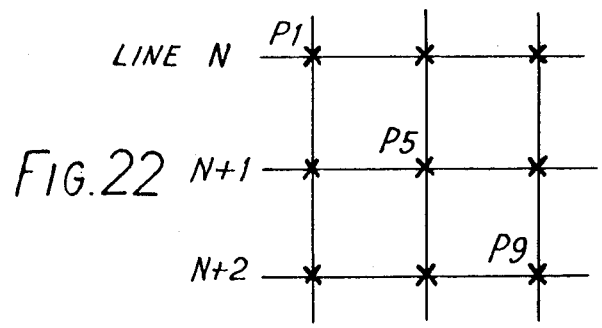
FIG. 22 shows an area voting pattern for movement detection.

FIG. 21 shows a system which incorporates a digital integrator. The subtractor 205 accepts old and new data as before and the difference is passed to ROM 206. The old movement code is received by the ROM. An integrator 208 also receives the difference signal from subtractor 205 and the integrator output is received by a comparator 209 which compares this signal with a threshold level and the comparator output is connected to an input of the ROM. The integrator accepts the difference signal and produces an average value over a given period of time longer than a picture point interval. Provided that the noise is of a statistical nature, the digital intergrator will generally sit with a value close to zero. Movement on the other hand will cause the integrator level to rise. The comparator and threshold system is applied to the output of the integrator and used to produce another signal which may be applied to the ROM. The ROM will have in addition to the two stored curves for k11 which are selected by the movement code described above, two further curves for k11 which are selected in dependence on the comparator output. The integration time may be selected as a part of a line, a full line, several lines or a complete field. In practice, a selection of several lines have been found to be a suitable value to differentiate. effectively between true movement and noise. The subtraction between old video data and new video data has been described on a single picture point basis. It has been found however that a more effective method of determining the difference between noise and true movement may be made if an area of picture is examined. FIG. 22 shows the area examination system. In the example given 9 picture points are arranged in the form of a square with a single picture point in the centre. To determine the total difference of picture point P5 a contribution from all surrounding picture points is made. The system has a particular advantage in a colour television system utilising NTSC or PAL colour subcarrier. Utilising the arrangement shown for area movement detection the system may be made insensitive to residual subcarrier. The design of a decoding circuit to eliminate residual subcarrier is simplified if a scheme is utilised which is generally insensitive to the presence of residual subcarrier components.

An example of how the area voting can be achieved is shown in FIG. 23.

In this system, each picture point is independently assessed for threshold and a majority logic gate applied to the decision, so that if a proportion of the points are found to have exceeded threshold, movement is signalled to have taken place. In this system, four out of nine is a practical setting to indicate movement. The difference is provided by the subtractor 205 as before the passes to comparator 206. The output passes to the majority logic gate 250. Only two of the nine inputs to the gate are shown in detail.

A further method of utilising the area voting system does not make use of majority logic. In this method, the total area is integrated, so that the average difference over the area is compared with a threshold. The object is to differentiate between noise and movement. The larger the number of picture points integrated, the closer the noise is averaged towards zero, whereas movement remains unattenuated.

On the other hand, there is a disadvantage of using too large an area due to the emergence of a noise "halo" around moving subjects. The noise "halo" approximates to the size of the area linear dimensions in both the horizontal and vertical axis. It is over that dimension that it becomes impossible to detect the difference between noise and movement utilising the area voting system.

In an effort to increase the detection's system ability to differentiate between noise and movement without increasing the area over which the decision is made, a combination of two fields can be utilised. In this way, it becomes possible to double the number of points within the area (volume) close to the picture point and thus attenuate the noise without attenuating the movement.

Figure 27:
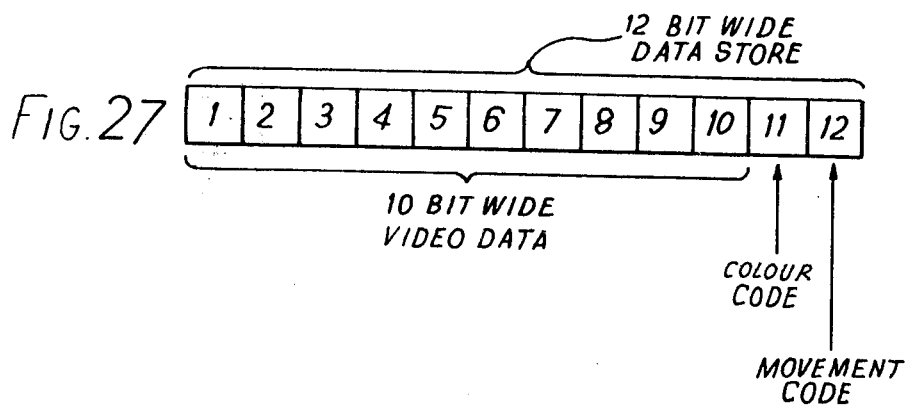
FIG. 27 shows the video data including colour and movement code.

During shots which involve camera 'panning' a higher value of persistence is generally chosen than when fixed camera shots are being displayed. Typical sports events involving following fast moving players involve panning shots whereas drama very often utilises fixed camera positions. A system has been devised to detect panning. The way in which the panning detector operates is shown in FIG. 27 for detecting horizontal and diagonal pans. A series of sampling points are arranged across the complete television raster. In the diagram shown vertical lines are chosen. The vertical lines are fixed against the television raster and in effect the picture moves behind the vertical lines. Whenever a camera pan takes place all of the vertical sampling points see movement occurring. The detection of movement at all of the vertical sampling points simultaneously indicates that a camera pan is occurring. On detection of panning the different coefficients can be automatically selected to produce the best subjective effect whenever a large number of the vertical lines sees this movement.

In practice for movement detection, the combination of point by point detection for large amplitude movement, together with area voting movement detection, provides good results. The area system is capable of detecting very small changes of tonal quality over an area, such as occurs when skin tones on a face move. The point by point threshold detection system is able to detect an instantanous single picture point movement of large amplitude such as occurs when a sharp edge transition is present in motion.

Movement detection is the subject of British patent application No. 31357/77.

The digital persistence is dependent on the capacity of the data store 22. In the system described with suitable storage, 16 complete frames of information may be stored and integrated before the store overflows using $M=8$; $Q=12$. At this level of integration a reasonable value for R is $R=10$.

Figure 25:
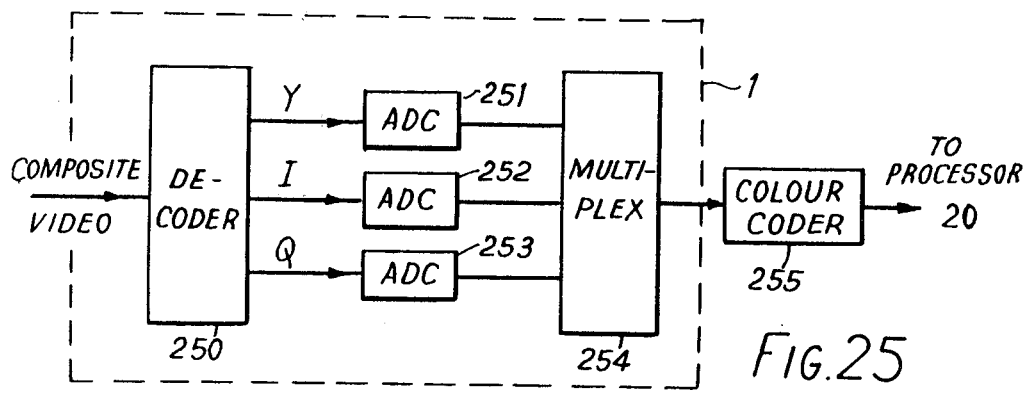
FIG. 25 shows an arrangement including the generation of a colour code for identifying data as chrominance or luminance information.
Figure 26:
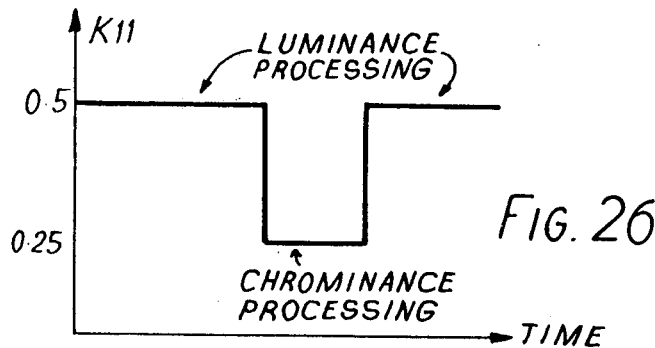
FIG. 26 shows the variation of K11 with the generated colour code.

In the system described so far, no distinction has been made between data which relates to chrominance or luminance information. It is possible, however, to utilise greater digital persistence on colour difference information than on luminance information. An arrangement is shown in FIG. 25 for generating a code to identify whether the data is chrominance or luminance information. A typical example of the decoding and conversion is also shown.

The decoder 250 produces separate signals for luminance and colour differences (Y, I and Q). These are converted into digital form in the converters 251, 252 and 253 then multiplexed in digital multiplexer 254.

The output of the input system 1 passes to the colour code circuit 255. Although coder 255 is shown at this point in the system it could be inserted elsewhere.

Once the signal has been digitised it loses its identity and it may be difficult to determine which particular sample relates to Y or I or Q. By providing an additional piece of information (bit) carried along with each digital sample, this identifies the sample as being from either luminance or colour difference information. Thus, whenever a sample is taken from I or Q (the colour difference signals) the colour code bit signifies this occurrence. Later circuits are able to identify the origin of the data sample by reference to the colour code bit.

By providing this identification bit, coefficients k11, k12 and k13 can be altered depending upon the origin of the digital data sample. As mentioned above it is possible to utilise a greater degree of digital persistence for colour difference signals without incurring movement portrayal distortion than may be used for luminance signals.

In principle, two sets of coefficients are stored in the set coefficients unit 25 utilising read only memory (ROM) techniques. Whatever luminance signals are detected the coefficients appropriate to luminance are selected by an examination of the colour code bit in the data word.

Figure 29:
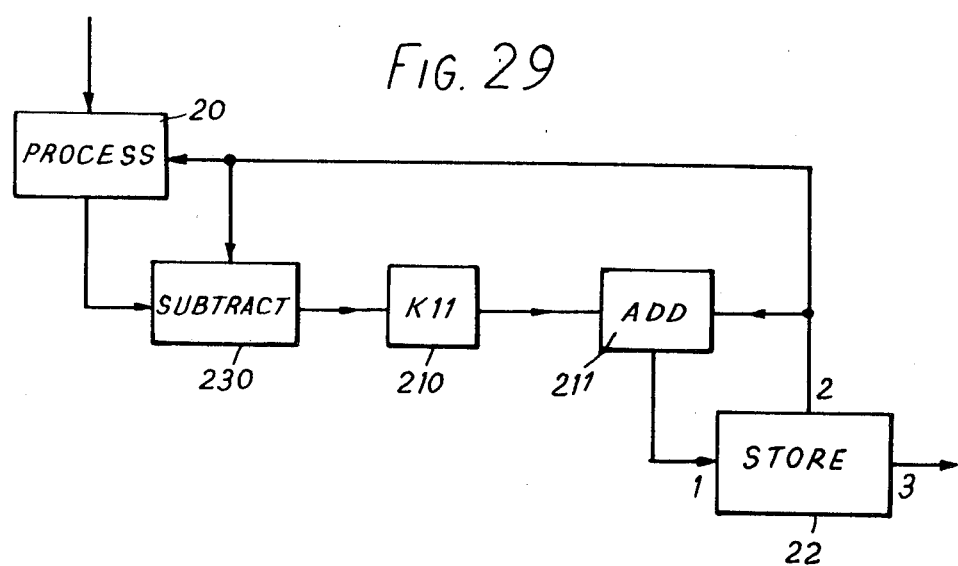
FIGS. 29 and 30 show alternative persistence systems using only K11.

FIG. 29 shows the diagramatic representation of coefficient k11 when the colour code bit is examined. Only two typical values of k11 are shown. With luminance processing, k11 is set at 0.5. When chrominance processing, k11 is set to 0.25. In this part of the description the assumption is made that k11 remains fixed irrespective of the movement detected in the picture. In practice the level of k11 will vary depending upon the movement detection system described above. Whenever colour difference signals are identified k11 is altered to provide more persistence.

FIG. 27 shows the handling of the colour code with the video data.

The colour code is shown as bit 11 accompanying the video data appearing as the most significant 10 bits and can thus be stored with the data to act as a readily identifiable code. The movement code referred to earlier with respect to FIG. 15 is shown as being carried as bit 12.

As a refinement to improve the system flexibility, one or more suitable programmed digital microprocessors could be used to calculate the required coefficients.

In addition, they can be used to determine the address locations fixed in store and to calculate the interaction of the controls for compression, expansion, digital persistence and other processing functions with the store locations and hardware coefficient look-up tables.

In the preceding descriptions, digital persistence and digital cyclic persistence were provided within a single store. An alternative form of persistence characteristic may be obtained by utilising more than one store. The method using one store is known as a recursive filter: the method using more than one store combines both recursive and non-recursive filtering and has been found to give improved results.

When the coefficient K11 is set to 0.5, the lag causes an undesirable visual effect on movement.

Figure 28:
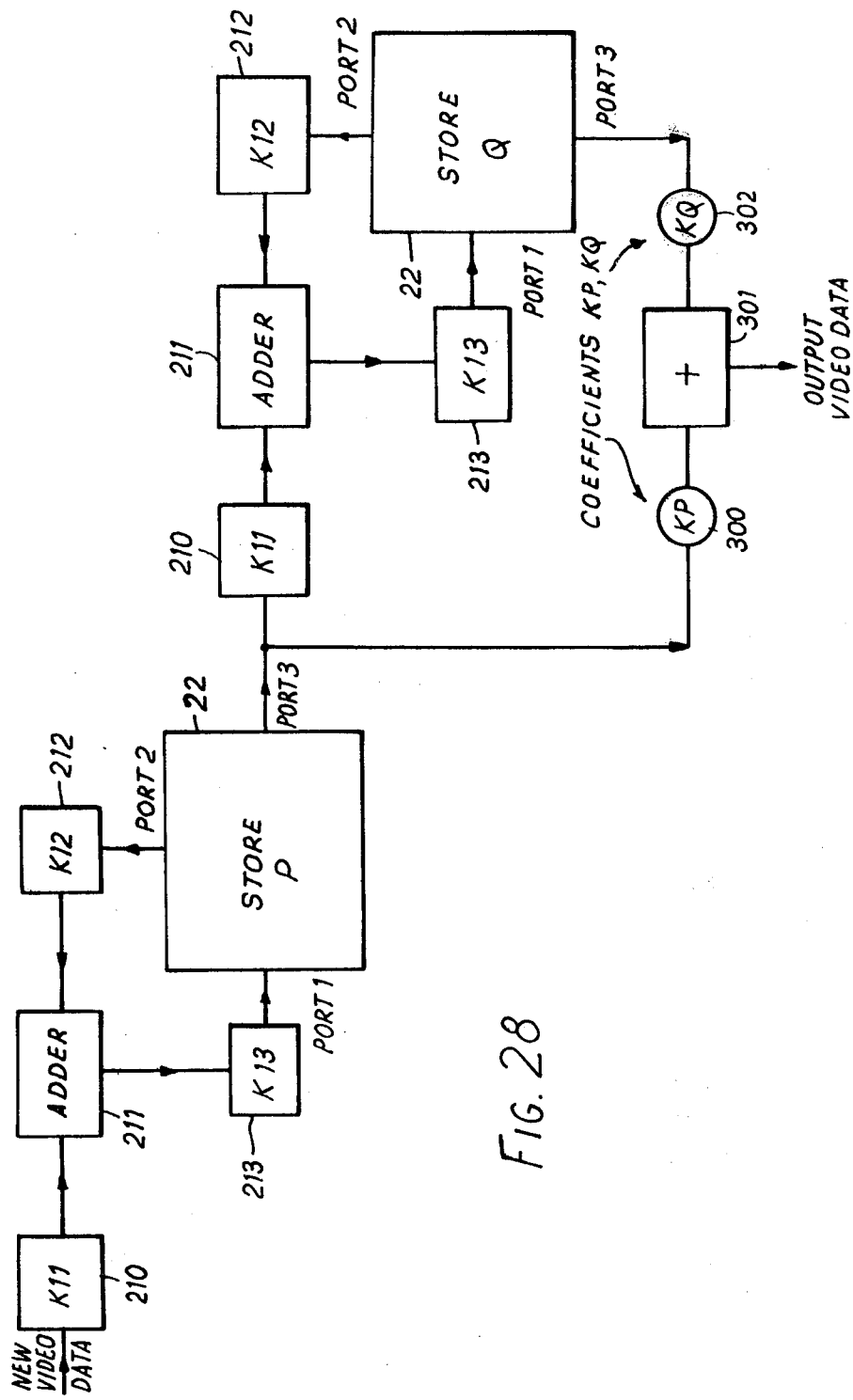
FIG. 28 shows an alternative standards converter system using both recursive and non-recursive filtering.

By connecting two similar systems in series, it becomes possible to add proportions of the two pictures together in a non-recursive method as shown in FIG. 28.

The system includes two stores 22 each with associated digital persistence components 210, 211, 212, 213. In addition the output of port 3 of store P is received by coefficient unit 300 for coefficient KP and store Q output is received by unit 302 for coefficient KQ. Their outputs are added in digital adder 301 to provide the video data system output. The operation of coefficients KP and KQ can be effected using the multipliers and look-up system described earlier.

Both systems shown in FIG. 28 are set to have K11 at 0.875. The addition of the two pictures takes place in an adder arranged to take a proportion KP and KQ from the two stores. KP and KQ are then cyclically varied in order to simulate the effect of movement interpolation. The values of KP and KQ are shown below for a 60 to 50 conversion.

| Field | KP | KQ |
| --- | --- | --- |
| 1 | 0.5 | 0.5 |
| 2 | 0.375 | 0.625 |

-continued

| Field | KP | KQ |
|---|---|---|
| 3 | 0.25 | 0.75 |
| 4 | 0.125 | 0.875 |
| 5 | 0.0 | 1.0 |

For convenience, two identical systems have been shown in series for ease of explanation. The requirements of store Q are not as stringent as those of store P, which is required to operate in a non-synchronous manner between input and output. Further, it is not necessary to utilise the recursive filter elements around store Q, which need only act as a simple delay store.

The addition of stored pictures through non-recursive filters provides a method of producing noise reduction in television signals. Although this is not a prime objective of the above non-recursive system of the standards converter, it does take place and is considered a useful feature.

Figure 30:
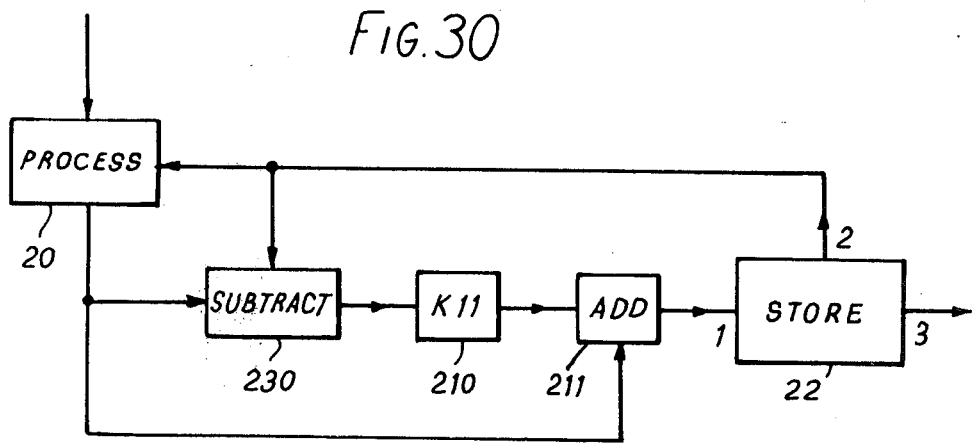

Although FIGS. 1 and 28 show stores with associated elements for coefficients K11, K12 and K13 these coefficient arrangements could be modified to provide only one variable coefficient (K11) as shown in the systems of FIGS. 29 and 30. A subtractor 230 is now included and as shown in FIG. 29 the processed data is received by the subtractor together with the output from port 2 of the store. This output also passes to adder 211. In the FIG. 30 arrangement the store output from port 2 only passes directly to the subtractor. The incoming video is now received directly by the adder 211. An alternative constructional embodiment of the store and processor is disclosed in U.S. application Ser. No. 841,519 in relation to FIGS. 31 to 36 thereof.

We claim:

1. A digital standards converter for video signals comprising:
   processor means for synthesising picture points from adjacent picture point information derived from the video signals from at least one field;
   video storage means for storing the information from at least one field; and
   digital persistence means for effecting movement interpolation between incoming and stored information.

2. A converter according to claim 1 wherein the digital persistence means includes cyclic control means for effecting cyclic control of the degree of digital persistence selected.

3. A converter according to claim 2 wherein at least two video storage means are provided to effect both recursive and non-recursive cyclic persistence.

4. A converter according to claim 3 wherein the output from said first video storage means is applied to one input of adder means via a first modifier means and the output from said second video storage means is applied to another input of the adder means to provide modified video data at the adder output.

5. A converter according to claim 4 wherein the first and second modifier means comprise multipliers adapted to apply cyclically varying coefficients to the data.

6. A converter according to claim 5 wherein the modifier means are adapted to apply coefficients which vary on a field by field basis, the coefficients being selected to be different for each modifier means.

7. A converter according to claim 2 wherein the digital persistence means includes at least one coefficient modifier for determining the amount of digital persistence applied to the system.

8. A converter according to claim 7 wherein the digital persistence means includes a subtractor for subtracting incoming and stored picture point information, a coefficient modifier for modifying picture point information received from said subtractor and an adder for adding the modifier output to the incoming or stored information.

9. A converter according to claim 7 wherein the modifiers comprise multipliers for modifying the picture point information by a selected coefficient.

10. A converter according to claim 9 wherein storage means are provided to store a number of coefficients for use by the multipliers and said cyclic control means effect selection of the stored coefficients to vary the coefficients on a cyclic basis field by field.

11. A converter according to claim 10 wherein the cyclic control means includes means for counting field pulses to determine field changes.

12. A converter according to claim 2 wherein the digital persistence means includes a first coefficient modifier for modifying picture point information received from said processor means, adder means for adding the output from said first modifier to stored data modified by means of a second modifier and third modifier means for modifying the adder output prior to storage in the storage means.

13. A converter according to claim 2 wherein a movement detector is provided to effect additional variation in the persistence in dependence on any movement detected.

14. A converter according to claim 13 wherein the movement detector is adapted to detect movement from a number of picture points from different fields.

15. A converter according to claim 13 wherein the movement detector is adapted to detect movement from a number of picture points contained in a vertical line of the picture to detect camera panning.

16. A converter according to claim 1, wherein the processor means comprises a volume processor for receiving picture point information from a plurality of picture points from more than one field.

17. A converter according to claim 16 wherein the volume processor is adapted to receive picture point information from a single line of one picture and from two lines of another picture.

18. A converter according to claim 16 wherein the volume processor includes selector means for varying the amount of picture point information from a preceding field used with the incoming information in dependence on any picture movement detected between fields.

19. A converter according to claim 18 wherein the volume processor includes a multiplier for each received picture point to effect modification by a selected coefficient and adder means for summing the outputs to provide the synthesised picture point.

20. A converter according to claim 19 wherein the multipliers comprise random access memories.

21. A converter according to claim 19 wherein movement detector means are provided to control the coefficients selected for use by the multipliers.

22. A converter according to claim 21 wherein the movement detector includes a subtractor for determining the difference between incoming and stored data and wherein coefficient storage means are provided for storing a number of coefficients for use by the multipliers, the selection being effected in dependence on the detected movement.

23. A converter according to claim 1 including means for generating a movement code to accompany the video data.

24. A converter according to claim 1 including means for generating a colour code to accompany the video data indicative of whether the video data contains chrominance or luminance information.

25. A converter according to claim 1 wherein the video storage means comprises an asynchronous store to accommodate differing field rates.

26. A method of effecting standards conversion on video signals comprising:
   synthesising a number of picture points from adjacent picture point information derived from the video signals from at least one field;
   storing the information from at least one field and adding a portion of the stored information to the incoming information to effect digital persistence for movement interpolation.

27. A method according to claim 26 including cyclically varying the degree of digital persistence selected.

28. A method according to claim 27 including storing the information twice to effect both recursive and non-recursive cyclic persistence.

29. A method according to claim 28 including modifying the stored information on a cyclic basis field by field from each storage step and adding the cyclically modified information.

30. A method according to claim 26 including detecting any movement occurring between fields to modify the picture point synthesis and digital persistence.

31. A method according to claim 26 wherein the picture points are synthesised from picture point information from one line of one field and from two lines of another field.

* * * * *